(12) United States Patent
Graf

(10) Patent No.: US 10,072,665 B1
(45) Date of Patent: Sep. 11, 2018

(54) MULTISTAGE COMPRESSORS AND REVERSE COMPRESSORS COMPRISING A SERIES OF CENTRIFUGAL PUMPS ALTERNATING FLOW TOWARD AND AWAY FROM AXLE WITH BETTER FLOW TRANSITIONS BETWEEN STAGES

(71) Applicant: Ronald E. Graf, Greensboro, NC (US)

(72) Inventor: Ronald E. Graf, Greensboro, NC (US)

( * ) Notice: Subject to any disclaimer, the term of this patent is extended or adjusted under 35 U.S.C. 154(b) by 0 days.

(21) Appl. No.: 15/200,020

(22) Filed: Jul. 1, 2016

Related U.S. Application Data

(63) Continuation-in-part of application No. 13/728,250, filed on Dec. 27, 2012.

(51) Int. Cl.

| | |
|---|---|
| *F04D 25/16* | (2006.01) |
| *F04D 17/12* | (2006.01) |
| *F04D 13/14* | (2006.01) |
| *F04D 1/06* | (2006.01) |
| *F01D 5/04* | (2006.01) |

(52) U.S. Cl.
CPC .............. *F04D 25/16* (2013.01); *F01D 5/04* (2013.01); *F04D 1/06* (2013.01); *F04D 13/14* (2013.01); *F04D 17/12* (2013.01)

(58) Field of Classification Search
CPC ....... F04D 25/16–25/166; F04D 17/12–17/14; F04D 19/02–19/048; F04D 1/06–1/10; F04D 13/12–13/14
See application file for complete search history.

(56) References Cited

U.S. PATENT DOCUMENTS

| | | | |
|---|---|---|---|
| 1,363,315 A | 12/1920 | Dron | 417/422 |
| 2,003,350 A | 6/1935 | Durdin | 415/55.5 |
| 2,092,565 A * | 9/1937 | Waseige | F02M 1/00 123/562 |
| 2,419,669 A * | 4/1947 | Birmann | F04D 29/444 415/200 |
| 2,429,978 A | 11/1947 | Richard | 415/420 |
| 2,834,534 A | 5/1958 | Marcel et al. | 415/144 |
| 2,933,884 A | 4/1960 | Foster | 60/595 |
| 4,645,419 A * | 2/1987 | Furuya | F04D 29/444 415/208.2 |
| 5,738,305 A | 4/1998 | Pruitt | 244/137.2 |
| 8,070,419 B2 | 12/2011 | Helmer et al. | 415/90 |

(Continued)

FOREIGN PATENT DOCUMENTS

GB    1506281    4/1978    ............ F04D 17/02

*Primary Examiner* — Laert Dounis
(74) *Attorney, Agent, or Firm* — MacCord Mason PLLC

(57) ABSTRACT

An engine using centrifugal pumps to form a centrifugal multistage reverse compressor with flow alternating inward and outward in series. It is fed, at either the periphery or the center of one of the pumps, by either compressed then heated air or by products of combustion. This invention also includes a set of related inventions, comprising a group of flow guides to convert radial flow to axial flow and a group to convert axial flow to radial flow and the combination of those flow guides. The invention also includes a multistage centrifugal compressor using combinations of centrifugal pumps with alternating pumps having inward flow of gas traveling from the periphery to the vicinity of the axle and having outward flow of gas traveling from the vicinity of the axle to the periphery. The invention also includes the using the above in an external heat engine or heat pump.

2 Claims, 12 Drawing Sheets

(56) References Cited

U.S. PATENT DOCUMENTS

| | | | |
|---|---|---|---|
| 8,087,242 B2 | 1/2012 | Hanson | 60/519 |
| 2010/0263405 A1 | 10/2010 | Durand et al. | 62/510 |
| 2014/0352024 A1 | 12/2014 | Echigoya | 2/69 |

* cited by examiner

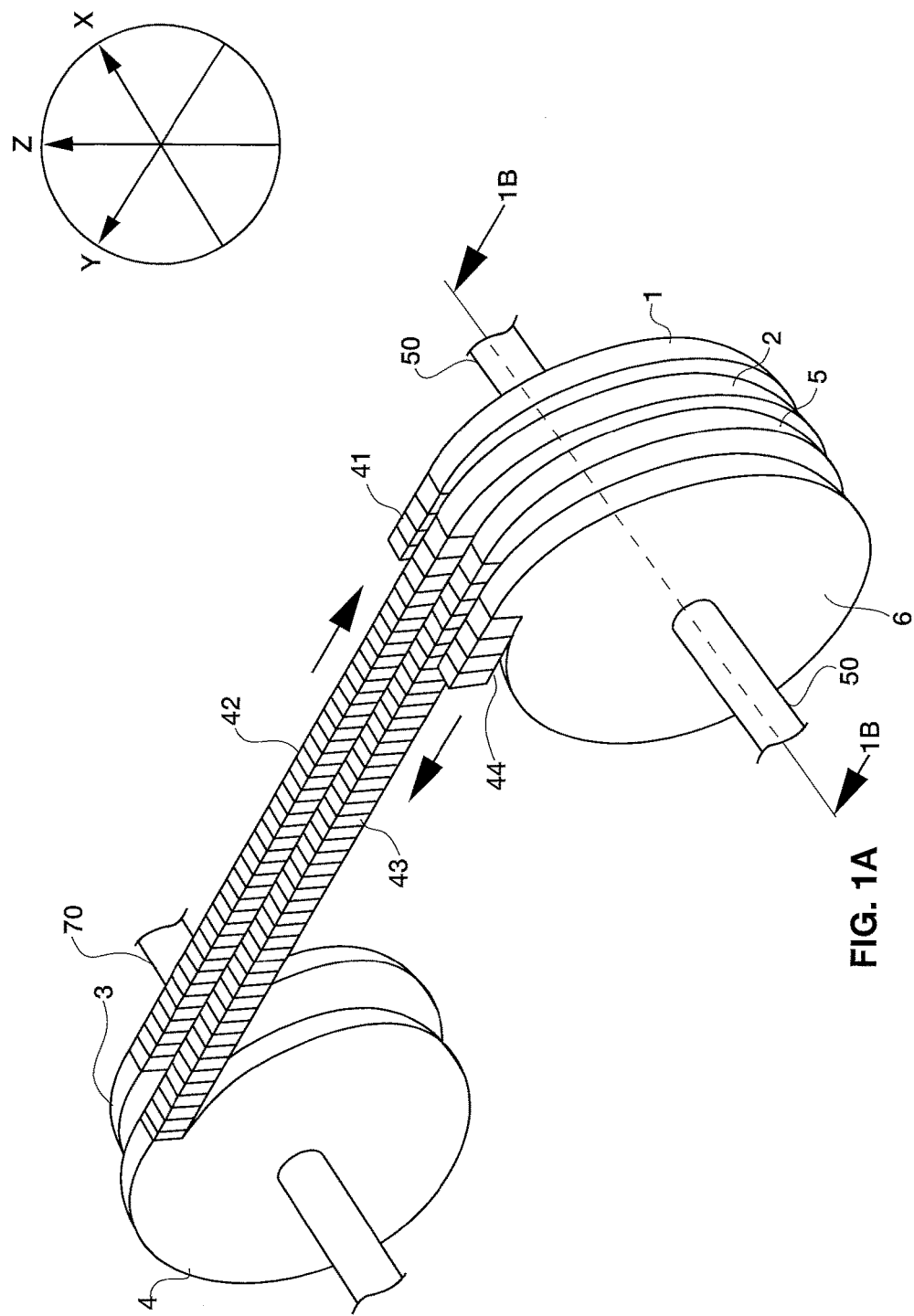

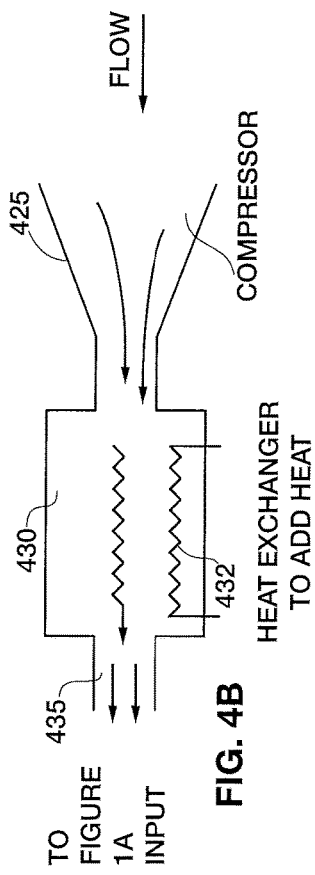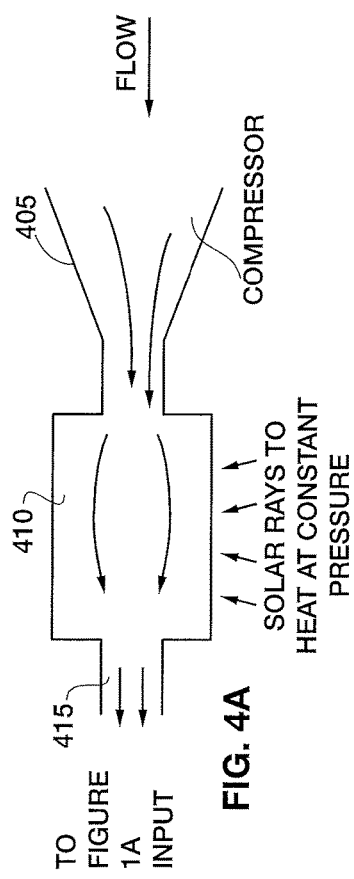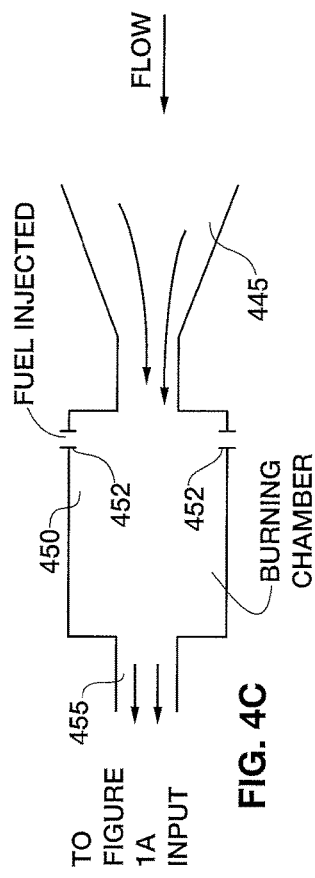

MULTISTAGE COMPRESSORS AND REVERSE COMPRESSORS COMPRISING A SERIES OF CENTRIFUGAL PUMPS ALTERNATING FLOW TOWARD AND AWAY FROM AXLE WITH BETTER FLOW TRANSITIONS BETWEEN STAGES

BACKGROUND OF THE INVENTIONS

(1) Field

Broadly, one field is turbines, especially turbine blades and flow. A second field is multistage centrifugal compressors. A third field is multistage centrifugal expanders (turbines). A fourth field is guides to change flow direction. A sub field is current art multistage centrifugal pumps.

Within these categories one field is multistage centrifugal compressors comprising a centrifugal compressor acting in the conventional fashion with flow from the center proceeding to the periphery, followed immediately by a new art centrifugal compressor component operated with flow from the periphery to the center. I will refer to both inward flowing and outward flowing components as pumps. Current art brings the flow back to the center before applying the second stage centrifugal compressor. The word compressor includes the concept that mechanical energy is converted to heat energy and macro velocity in a fluid.

Note that the word expander (turbine) also referred to herein as a reverse compressor includes the concept that heat energy and macro velocity in a gas flowing through it is converted into mechanical energy The mechanical energy in the case of a centrifugal expander (reverse compressor) is received by a rotor pushed by the flow of the gas through the expander. Most often the temperature of the gas goes down in the interval between entering and leaving the expander. Most often the gas expands within the expander. A centrifugal expander is defined as a centrifugal pump operated with new art flow directions to act as an expander. In older art the centrifugal pump is mainly thought of as a compressor component.

The multi-stage centrifugal expanders could start flow either at the center or at the periphery and use more than two stages. The rotors may or may not all be on the same axle. Each stage, using new expanders, has blades held between a couple of discs. The discs need not be flat but can be concave or convex. The distance between the discs of a pair may be smaller or larger at the periphery to account for expansion or shrinkage of the fluid due to pressure drop or due to velocity change or due to temperature change or any combination. Later stages in an expander may have discs further apart than those of earlier stages. Later stages in a compressor may have discs closer together.

This invention also applies specifically to the above described multistage expanders acting as expanders in an internal combustion engine or hot gas injecting engine. The new art engine consists of a source of pressurized hot gases, for example compressed gas heated by a heat exchanger, the exhaust of a burner or simply compressed air heated by solar energy. The pressurized hot gases would be applied either at the center of a centrifugal compressor pump acting as an expander, or at the periphery of such a compressor acting as an expander. All possible hot gas sources need a front end compressor, even [the jet engine and] the burner. Air is sucked in and compressed, then a fuel is added and burned producing not only $CO_2$ and $H_2O$, but also compressed $N_2$. Air is 80% $N_2$. In the cases of compressed air heated by solar energy the composition of the hot gas is $O_2$ plus $N_2$. The relative amount of $N_2$ can be increased by burning a lean fuel mixture. In all cases $N_2$, a diatomic gas, is more than half the input to the expanders. This means that about 8 stages of expansion are necessary using standard steel in the pumps to change the output temperature to half the input temperature giving 50% efficiency.

If input gas is applied at the center, near the rotor rotation axis in most cases an axle for the first stage spiral then the blades are pushed by the expanding fluid with a component of the normal to the pushed surface pointing toward the center. The blades appear concave to the pushing fluid while it spirals outward. This would be true of any spiral much like a pinwheel rotating due to the flow. Because of conservation of angular momentum, in the system of blade assembly and pushing fluid, the rotation set up in the spiraling fluid is opposite to the blade rotation.

If input gas is applied at the periphery the blades are pushed by the fluid. Usually a component of the normal to the pushed surface will point toward the periphery. In this case, the blades appear convex to the pushing fluid, while it spirals inward. The blades rotate so their angular momentum around the axis is in the same direction as the angular momentum of the entering fluid around the same axis. The blades could be straight or even slightly curved the other way, but this would reduce efficiency.

One aspect of the present invention includes how fluid transitions from one pump to the next. In the reverse compressor, the fluid if moving from center to periphery has angular momentum opposite to that of the blades. If the next stage is on another axle rotating in the same direction (clockwise or counter-clockwise) the fluid can flow straight out from the periphery of one stage and into the periphery of the next with the connecting path traveling between the two axles. If the next stage is on another axle rotating in the opposite direction (clockwise or counter-clockwise) the fluid can flow straight out from one stage and into the next with the connecting path traveling on the same side of the two axles. If on the same axle the fluid must turn 180 degrees at the periphery before entering the next stage periphery.

Assuming that the fluid has spiraled inward in a stage, called the prior stage, the fluid must spiral outward in the next stage. Before introducing the fluid into the center of the next stage centrifugal expander, the fluid must go from radial motion to axial motion immediately upon leaving this prior stage. This transition will be shown and discussed. The fluid will then be changed from predominantly axial back to predominantly radial into the next stage (also discussed). Another aspect of the present inventions includes methods of transitioning using fluid guides, probably attached to the axle. In an embodiment after leaving the fluid guides also called flow guides, the spiral will then occur from center to periphery with the surface of the blade being pushed having a component pointing to the center.

(2) Related Art

The closest related art is the current multistage centrifugal compressors. The flow in all rotor driven compression stages in current art starts near the axle of the rotors and ends near the periphery of the centrifugal pumps.

Another related former art is axial expanders and axial compressors. They use many small blades like feathers and thus produce eddy currents near the blades. Axial turbines as expanders (reverse compressors) act as if they have two concentric axles one going clockwise and the other going counter-clockwise. The flow is violently changed in rotation direction by the many blades of each turbine wheel. This is to accommodate the opposite rotation of the next stage. Also the blades pass each other very rapidly. Many eddy currents are produced as a result of both the direction change of gas passing between blade sets and the close passage of the blade sets as well as the use of blades having edges. Also the flow path is constantly changing as one blade leaves and flow hops to the next blade.

Another related art would be the shockwave engines, currently funded for proof of concept by ARPA-E. The problem for the shockwave engine is that they expel the products of combustion at a high temperature and thus lose most of the heat energy. A second problem is that the fluid is expelled in a direction which is not as perpendicular to the radial direction as mine is, thus losing some torque.

There are many external heat engines that expand and contract a working fluid. One example is the Stirling engine which in its most famous form uses a large piston to oscillate the fluid between being cooled and being heated. The oscillation of temperature is caused by sending the fluid through a regenerator and having a heat exchanger heating source on one end and a heat exchanger cooling source on the other end of the regenerator. The power output piston communicating with the same working fluid as that being oscillated is synchronized out of phase with the oscillator piston. Each pass through the regenerator loses some energy in flow resistance. Also there is a hysteresis loop in the temperature out of the regenerator There is friction and pressure and temperature loss at both pistons, but mainly at the output piston. Also in former art Stirling engines the dead volume versus piston displacement must be kept small.

Also, many current external heat engines require a regenerator, which causes power loss by fluid drag and thus pressure loss across the regenerator, and which also causes power loss by temperature difference hysteresis between the regenerator parts and the fluid.

My earlier invention U.S. Pat. No. 8,087,247 has almost zero losses due to motion of parts with respect to each other. The rotors are attached to the container in my earlier patented invention. However, in the preferred embodiment of that patent, it rotates the whole container of the working fluid and thus is best used in solar power, where the hot heat exchanger can be fed on the fly by solar radiation moving at the speed of light from the sun.

Another related art would be centrifugal compressors and turbo-machinery. To maximize the ratio in pressure between an input near the center and an output near the periphery of a compression fan, the spiral of the blades as they go from the center to the outside should be retrograde (counter to the rotation direction). The pressure is further increased as the fluid is returned to the center for a second centrifugal compression. In my current invention to get a larger pressure ratio than simply channeling the fluid between an input near the periphery and an output near the center, I introduce a centrifugal pump replacing the channel. The spiral of the blades as they go from the center to the outside should be (the same as the rotation direction) so as to scoop in the fluid.

A similar statement applies to blades of inward and outward bound expanders, except that the rotations of the blades are reversed. Thus blade normals tend to aid flow between center and periphery in a compressor and tend to oppose flow in an expander (reverse compressor).

Typical multistage compressors using retro curved blades compress partly in a stage as the fluid travels outward to the periphery. Before the next and similar stage the fluid is guided in stationary ducts from the periphery to near the axle again thus further compressing the fluid by ramming it in the duct.

Prior engines produce localized circulations and turbulence especially where the blades are close to the blade casing. There is rapid relative motion between closely spaced components in most if not all prior art.

When we reverse all flow directions and all rotation directions of a compressor of my design we get an expander (reverse compressor). The fact that the pressure ratio in the expander and compressor are almost equal in magnitude in the normal outflowing compressor stage can be seen better in the engine described in U.S. Pat. No. 8,087,247. The effects in the rotating drum of that invention are more obviously equal as pointed out in that patent.

SUMMARY OF THE INVENTIONS

This invention is a set of related inventions, including a group of flow guides to convert radial flow to axial flow and a group to convert axial flow to radial flow both conversions being done with less eddy currents than if the flow guides are not added to break the flow into a number of substantially parallel flows. Of course the two groups of flow guides can be combined into one group of flow guides that receive flow traveling toward the axle or axis of rotation of a rotor of a centrifugal pump and turns the flow so it is traveling away from the axle in a separate centrifugal pump.

Note that the words "centrifugal pump" is a way of referring to one of four different types of pumps each having a chamber formed in part by the casing and containing a rotor. Each chamber has an opening at the periphery and has an opening near in the vicinity of the center of the chamber. One of the two openings will be called an exit meaning that fluid flows out of it from the pump chamber. The other opening will be called an opening and fluid flows into the chamber through this opening.

Of the four types of pumps, a first type of pump is the typical centrifugal compressor and a component of a multistage compressor converting mechanical energy to fluid energy mainly pressure energy and heat energy. It has a casing with a chamber like the typical single stage centrifugal compressor. It has flow going from the vicinity of the center of this chamber to the periphery of the chamber and a rotor rotating on an axis the rotor's center of gravity being near that center of that chamber and rotating in the same direction as the fluid spiraling outward.

A second type of pump is also a component of a multistage compressor converting mechanical energy to fluid energy. It also has the same typical casing with a chamber like the first pump. It has flow going from the periphery to the vicinity of the center of this chamber. It has a rotor rotating on an axis the rotor center of gravity being near the center of this second chamber and rotating in the opposite direction as the fluid spiraling inward. This rams the fluid and causes more rapid compression.

A third type of pump is the reverse of the second type of pump above. It is a component of a multistage reverse compressor converting fluid energy, mainly in the form of pressure energy and heat energy although some of the fluid energy is in momentum, to mechanical energy. It has a casing with a chamber like the typical single stage centrifugal compressor. It has flow going from the vicinity of the center of a chamber to the periphery of the chamber and a rotor rotating on an axis near that center of that chamber and rotating in the opposite direction as the fluid spiraling outward. The fluid causes the rotor to rotate to conserve angular momentum.

A fourth type of pump also has the same typical casing with a chamber like the first pump's. It has flow going from the periphery to the vicinity of the center of a chamber. It has a rotor rotating on an axis near the center of this chamber and rotating in the same direction as the fluid spiraling inward.

Note that each of the pumps above has a chamber formed by the pump casing, the chamber containing a rotor whose rotation axis is near the center of the pump chamber the nearness being measured in radial coordinates with respect to the rotation axis of the rotor. Note with respect to language in the claims that the words "first", "second", "third", and "fourth" do not refer to ordering or to the number of the items, but they are more like the words "red", 'white", "blue" and "yellow" merely used to distinguish later which one of the items is being referred to.

The invention also includes, as one of the two new aspects toward which it is mainly directed, the use of combinations of centrifugal pumps used to foim a multistage compressor with at least one pump processing a flow of gas traveling from the vicinity of the axle toward the periphery of the pump and with at least one other pump processing the same flow of gas traveling from the periphery of this other pump toward the axle of this other pump. The word "processing" substantially means converting between mechanical energy and heat energy. Notice that one of the two types of pumps of the multistage compressor is using the pump with the flow direction reversed from the conventional use of a centrifugal pump. Also the word axle might be replaced with axis, because while the axial turbines made by General Electric have alternate sets of blades rotating clockwise then counter-clockwise on the same axis they cannot be on the same axle.

The invention also includes, as one of the two new aspects toward which it is mainly directed, the use of combinations of centrifugal pumps used to form a multistage expander otherwise called a multistage reverse compressor with at least one pump processing a flow of gas traveling from the vicinity of the axle toward the periphery of the pump and with at least one other pump processing the same flow of gas traveling from the periphery of this other pump toward the vicinity of the axle of this other pump.

The invention can be used in an external heat engine or in a heat pump.

This invention as a multistage expander can also be used in an internal combustion engine. One embodiment of this invention also includes the introduction of a heated gas under pressure. For example, air in a continuous flow path can be pressurized by a compressor and then heated by solar energy and then introduced into either the periphery or the center of one of the pumps in the centrifugal multistage expander.

No multistage expanders using rotors currently exist in the art. Nor are there multistage expanders or compressors combining two stages into one round trip for the working fluid from periphery to center and back to periphery or combining two stages from center to periphery and back to center.

One object of the current invention was to produce an engine/heat pump which, when operating at a steady speed, has no changes in temperature at any particular point. Thus heat loss due to changing operating temperatures at a particular position are negligible, since the temperature of the working fluid is always the same as the temperature of its nearest container wall. This is accomplished by using the centrifugal pumps thus allowing smooth unidirectional flow both in the pumps and in the fluid connections between the pumps. Where positive displacement pumps are used in former art there are wild temperature variations at points in the pumps. Where regenerators are used there are wild temperature variations at points in the regenerators.

Another object of the current invention was to produce an engine where there is essentially no loss of pressure around pistons or blades.

In my invention the amount of casing which is near moving parts is minimized by locating the blades between discs. Also moving surfaces at an angle to the container, where the intersection of the surfaces is moving, are minimized or eliminated by using discs to hold, encase, and rotate with the rotor blades. Thus the edges of the blades where they are attached to the discs are shielded by the discs.

Another object of the invention applied to external heat engines was to produce an engine that would have no loss of working fluid to the outside or around pistons, since substantially the working fluid is in a container that does not change shape or volume, except for stress or strain. There are no moving elements such as axles that pierce the skin of the container. Argon and krypton gas would not permeate or escape from its enclosure if steel is used. Only electric wires if used pierce the skin of the working fluid container.

Another object of the current invention was to produce an engine which produces very little metal fatigue, since the rotating parts maintain a nearly constant rotational speed thus keeping stress almost constant.

Another object of the current invention is to produce an engine that needs no lubrication, except at the axles. There is no other friction wear in the engine.

Another object of the current invention is to produce an engine that needs no seals. The seals could produce a problem in other engines at high temperature.

Another object of the current invention was to produce a very low loss heat pump that allows the temperature ratio to be varied, by varying the rotation speed.

Another object of the current invention was to [produce] enable a heat pump that can be made mostly from aluminum and use argon as the working fluid.

Another object of the current invention is to use a rotor to eject fluid at a high pressure near the periphery, the rotor consisting of tubes having increasing cross-section as we move outward from the rotation axis. The tubes may be comprised of two consecutive blades and that portion of two discs extending between the blades. The discs, which sandwich the blades between them thus supporting the edges of the blades, may flare outward away from each other as we travel away from the rotation axis, thus looking something like parabolic mirrors. They should approach the fluid container at or near their periphery and no sudden change should be made in the flow cross-section as the fluid enters the conduit between pumps. It may be useful to have a knife edge on the periphery of the discs, so the discs can remain strong and yet approach the conduit entrance smoothly with the surface closest to the blades.

Another object of the current invention is to produce an engine having the smooth uniform flow properties of the current invention and also allowing the heat exchangers of an external heat engine to be any size and located anywhere and stationary, limited only by the pressure losses due to fluid drag within them.

Another object of the current invention is to produce an engine where all the moving parts are contained within the fluid container. If one of these parts fails, the broken pieces may be contained by the fluid container, thus preventing damage to surroundings.

Another object of the invention was to produce an engine with negligible friction loss, since there are almost no solid parts moving relative to each other due to the engine cycle. Of course, as with most engines, the rotor shaft is rotating with respect to parts of the device supporting the shaft, such as bearings whether ball or magnetic. Also, the perimeters of the discs holding the rotor blades will move in a circle relative to the container of the working fluid. We have a moving circle at the periphery of the disc opposing a fixed circle, the configuration looking the same at all times no matter how big or small the angle of rotation and thus minimizing fluid induced drag.

Another object of this invention is to produce a more efficient multiple stage centrifugal expander that receives mechanical energy from a fluid both while the fluid is traveling from near the axle of a rotor toward the periphery of the rotor and while the fluid is traveling from the periphery of a rotor toward the axle of the rotor.

Another object of this invention is to provide an efficient means being fluid flow guides to change the flow from radial inward motion to axial motion and an efficient means being fluid flow guides to change flow from axial motion to radial outward motion. Similarly at the periphery there are smooth transitions to transfer from the outward flow to the inward flow.

Another object of this invention is to show a new type of internal combustion engine or more generally a hot compressed gas engine comprising a part of the whole engine which part converts hot gas entering it under pressure to energy of motion and expels cooler gas.

These and other aspects of the present inventions will become apparent to those skilled in the art after a reading of the following description of the preferred embodiment when considered with the drawings.

BRIEF DESCRIPTION OF THE DRAWINGS

FIG. 1A is a perspective drawing of the casings and pipes of four pumps whose rotors rotate on a first axis or axle and the casings and pipes of two pumps on a second axis or axle. Two pumps on the first axis are connected to two pumps on the second axis by fluid carrying pipes. Two other pipes on the remaining pumps on the first axis introduce and expel fluid.

FIG. 4A shows a compressor followed by a space in which solar rays can heat the compressor output which then goes to the input of FIG. 1A.

FIG. 4B shows a compressor followed by a heat exchanger to heat the compressor output which then goes to the input of FIG. 1A.

FIG. 4C shows a compressor followed by a burning chamber in which the compressor output is heated. The heater output then goes to the input of FIG. 1A at almost the same pressure as the compressor output.

DESCRIPTION OF THE EMBODIMENTS

Figure 1B:
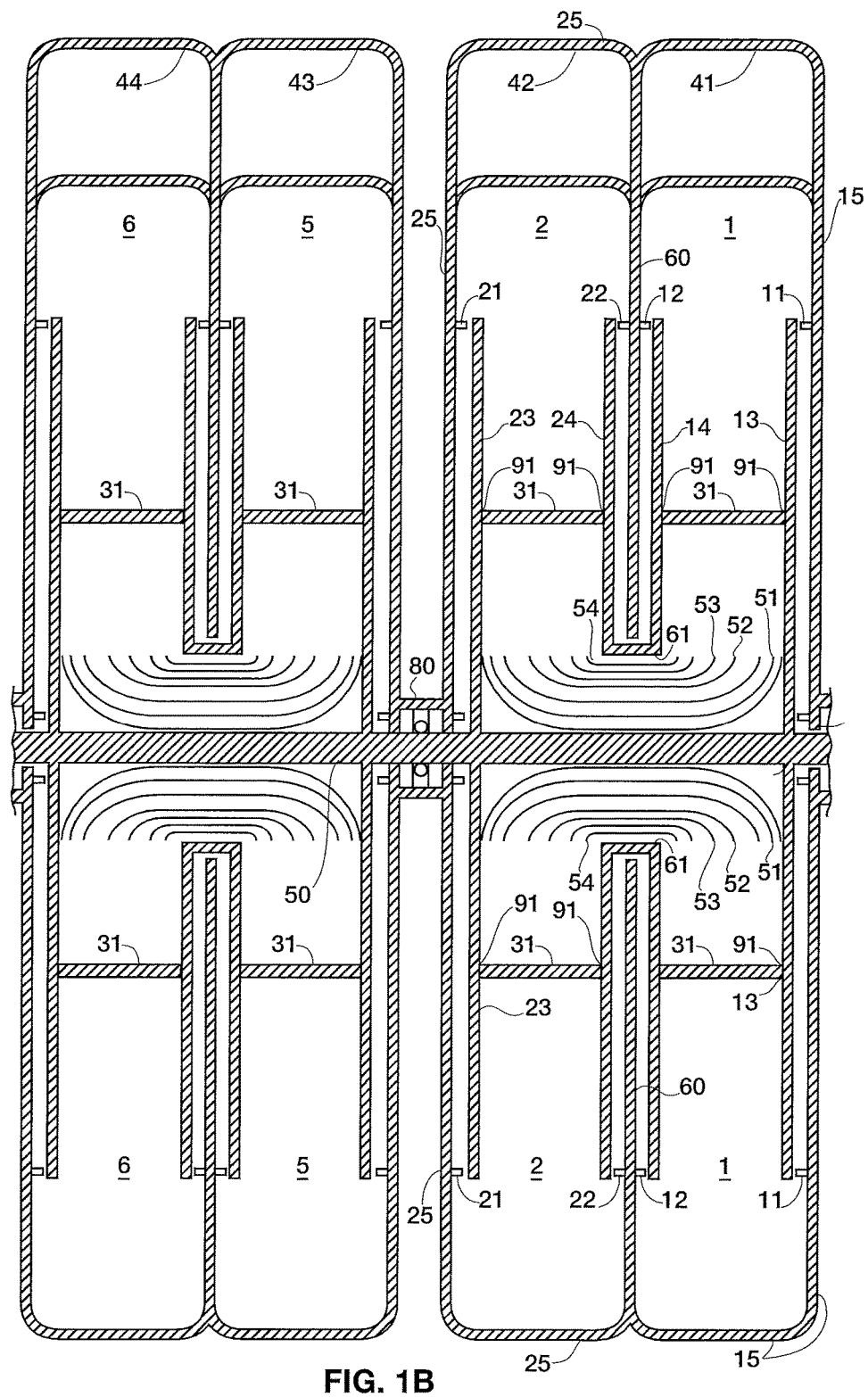
FIG. 1B shows a planar cut containing the axis of the four pumps. It shows the four pipes at the top of the figure, close to the points where the pipes enter the pump casings and shows rotor discs with holes at their center and centered on the axis and holding the rotors of the four pumps. It also shows the blades extending between the discs. The blades are curved and thus only are shown where the cut intersects the blades. It also shows a cut of the fluid flow guides contiguous to the axle and shows the axle.

In one embodiment, a series of centrifugal pumps may be used as a multistage expander where "reverse compressor" may be substituted for the word "expander". Half the pumps have flow traveling from the periphery toward one or more axles or axes of rotation of the rotors. The other half of the pumps have flow traveling from near an axle to the periphery. There may be one extra pump of either flow type. In another embodiment, the multistage expander or any multistage expander may be used as part of an internal combustion engine, although only the multistage expander will be claimed. In another embodiment, the multistage expander or any multistage expander may be used in an external heat engine, also not in the claims. Flow guides converting between axial and radial flow will also be discussed. Eventually a series of centrifugal pumps each used as a multistage compressor component will be described. Half these centrifugal pumps have flow traveling from the periphery toward the axle. The other half of the pumps are conventional, having flow traveling from the axle to the periphery. The traveling of course is on a spiral path.

Note that the word expander includes the concept that heat energy and pressure energy and flow kinetic energy of motion in a gas flowing through the multistage expander (reverse compressor) is converted into mechanical energy. The mechanical energy in the case of a multistage reverse compressor comprising centrifugal pumps is received by pump rotors pushed by the flow of the gas through the reverse compressor.

Continuing to describe the flow in FIG. 1A, the fluid leaves pump 2 at its periphery and proceeds along pipe 42 to the periphery of pump 3. It then proceeds to the center exit of pump 3 near axle 70. It then proceeds from the center exit of pump 3 to the center opening of pump 4. It then proceeds through the rotor region of pump 4 to the exit at the periphery of pump 4. It then proceeds along pipe 43 to the periphery of pump 5 and through the rotor region of pump 5 to the exit of pump 5 near the axle 50. The fluid then proceeds through a flow guide region to the entrance of pump 6 near axle 50. The fluid then goes through the rotor region of pump 6 to the exit at the periphery of pump 6. It then enters pipe 44 to exit the pumps shown in FIG. 1A.

Figure 2A:
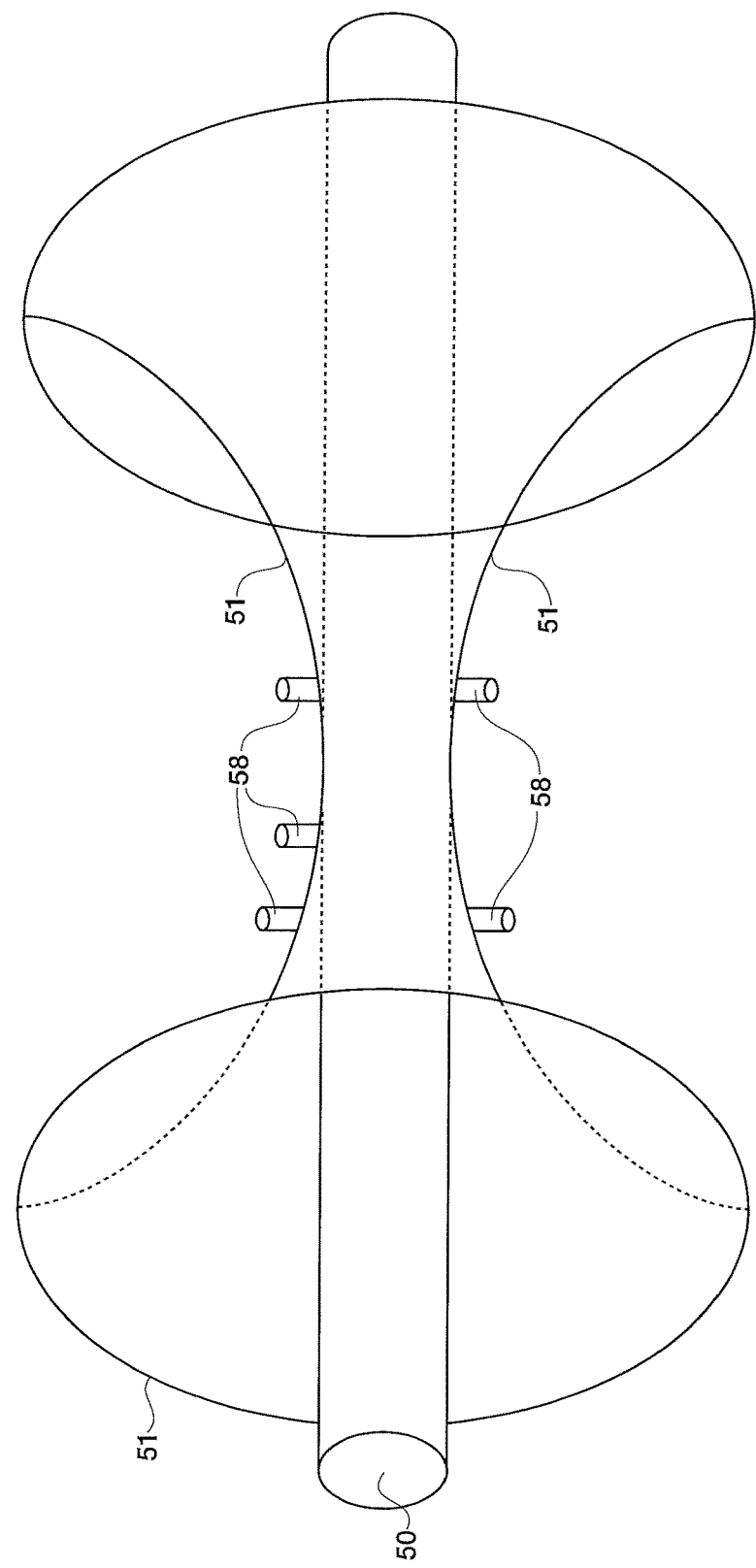
FIG. 2A shows the flow guide closest to and touching the axle.
Figure 2B:
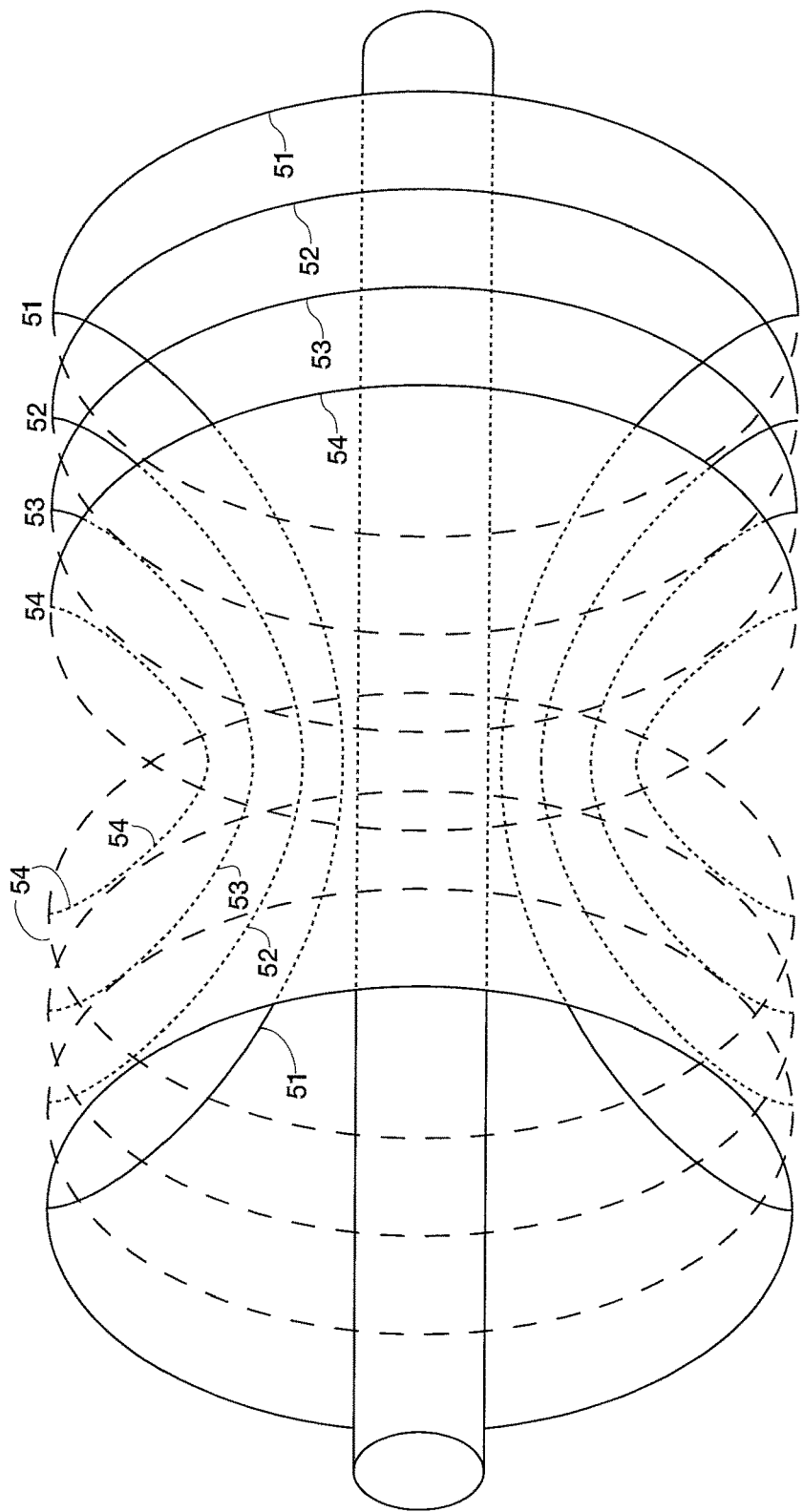
FIG. 2B shows four fluid flow guides in a perspective view showing that the flow guides are round having circular symmetry with respect to the axle.

FIG. 1A shows a workable, but simplified, version of a set of centrifugal pumps combined with pipes carrying fluid between them to act as a multistage reverse compressor. Pump 1 receives fluid at its periphery from pipe 41. The fluid flows inward toward the pump 1 axis of rotation. The fluid then flows from pump 1 to pump 2 passing through a region of flow guides as may be seen most clearly in FIG. 1B which also shows the flow guides 51 through 54 in the vicinity of the pump rotor axis of rotation. The flow guides smoothly turn the fluid from inward radial motion in pump 1 to outward radial motion in pump 2. The fluid flows in pump 2 through the rotor region from near the axis of rotation to the periphery. The rotor of pump 1 has blades 31 attached to discs 13 and 14 at attachment points 91. The rotor of pump 2 has blades 31 attached to discs 23 and 24 at attachment points 91. All rotor blades are labeled 31. The rotor of pump 1 rotates because disc 13 is attached to the axle 50. The rotor of pump 2 rotates because disc 23 is attached to the axle 50. The flow guides are more clearly shown in FIGS. 2A and 2B where they are labeled 51 through 54. They are round composed of full circles centered at the rotation axis or axle 50. The circles diminish in radius as the point between the two pumps is approached and then increase in radius until they end at pump 2. The apparent circles in FIG. 2A and FIG. 2B are the ends of the flow guides. The apparent arches are the outside of the flow guides showing how the circles diminish then increase in radius. The flow guides are like two round funnels attached at their smallest opening.

The flow guides are in most part locally substantially parallel but the distance between them can vary somewhat with position. In this case the flow guides divide the flow into several distinct paths. The flow guides rotate with the axle and are connected to each other by supports or columns 58 shown in FIG. 2A that extend between nearest flow guides and can be used to maintain rotation of the flow. Some supports also extend from the axle to the nearest flow guide.

Figure 3B:
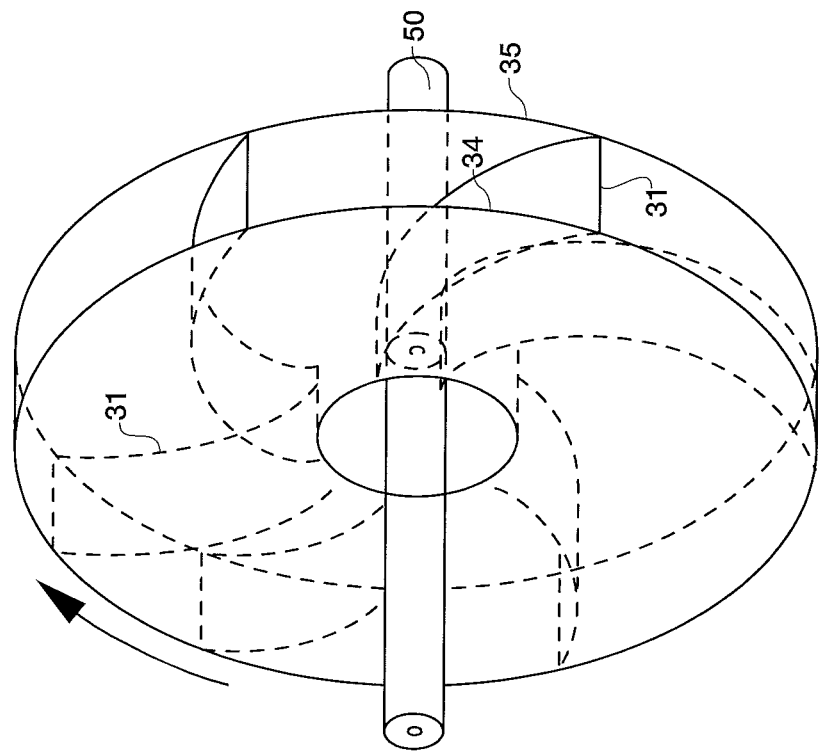
FIG. 3B shows another rotor with blades held between discs. The disc through which fluid travels to or from the pump has a larger hole at the center than the other disc which attaches to the axle as can be seen in FIG. 1B.
Figure 3A:
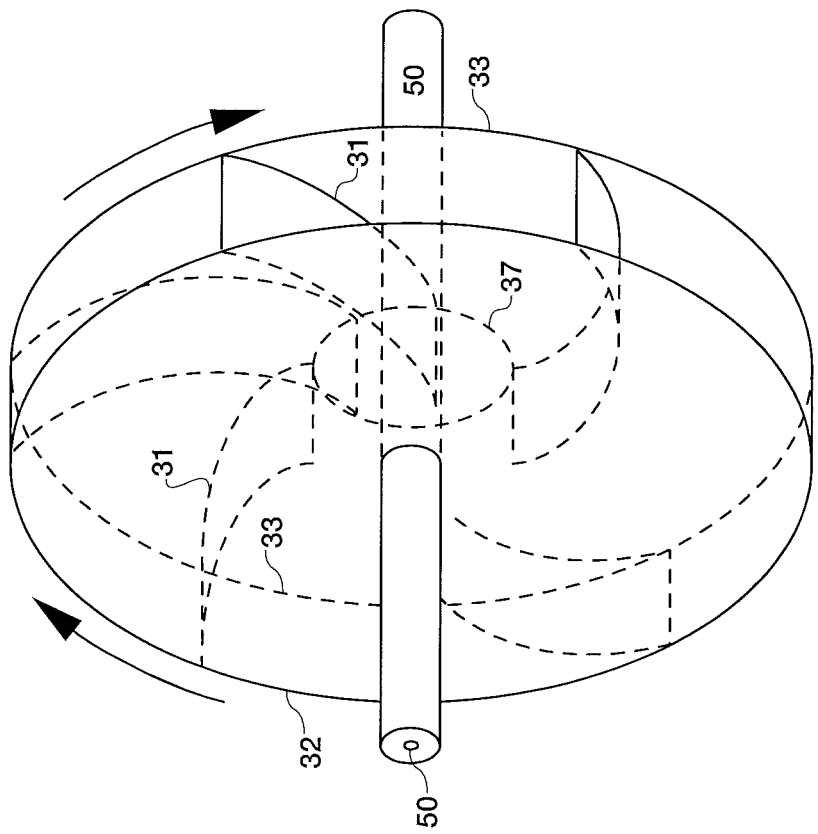
FIG. 3A shows one rotor with blades held between discs. The disc through which fluid travels to or from the pump has a larger hole at the center than the other disc which attaches to the axle as can be seen in FIG. 1B.

Disc 32 and disc 33 in FIG. 3A hold the blades 31 at two edges for each blade. Disc 34 and disc 35 in FIG. 3B hold the blades 31 at two edges for each blade. Hole 37 in disc 33 allows fluid to enter the pump near the axle. A similar hole on disc 34 allows fluid to leave the pump near the axle.

FIGS. 3A and 3B show rotors with blades and show the direction of rotation for a multistage reverse compressor. FIG. 3A is for pump 2 and pump 6 wherein the fluid flows from near the center of the pump chamber to the periphery of the pump chamber. Notice that the fluid spiral induced by the blades is opposite to the rotation direction of the rotor in FIG. 3A. FIG. 3B is for pumps 1 and 5 wherein the fluid flows from the periphery of the pump chamber to near the center of the pump chamber and the flow spiral rotation will be in the same direction as the rotor rotation.

FIG. 4A shows how solar energy can be used to produce heated pressurized flow into pipe 41 of FIG. 1A. Pipe 415 carries the heated flow to 41. Compressor 405 not only pushes the flow but also increases pressure for subsequent input to the expander. Box 410 represents a solar device to heat the flow at constant pressure.

FIG. 4B shows how a heat exchanger can be used to produce heated pressurized flow into pipe 41 of FIG. 1A. Pipe 435 carries the heated flow to 41. Compressor 425 not only pushes the flow but also increases pressure for subsequent input to the expander. Box 430 represents a heat exchanger with heated part 432 to heat the flow at constant pressure. FIG. 4C shows how a burning chamber can be used to produce heated pressurized flow into pipe 41. Pipe 455 carries the heated flow to 41. Compressor 445 not only pushes the flow but also increases pressure for subsequent input to the expander. Box 450 represents a burning chamber with fuel injection at nozzles part 452 to heat the flow at constant pressure. The flow can leave at pipe 44 in FIG. 1A and can be sent into the atmosphere or on to another component such as a compressor for fully contained flow.

Figure 5A:
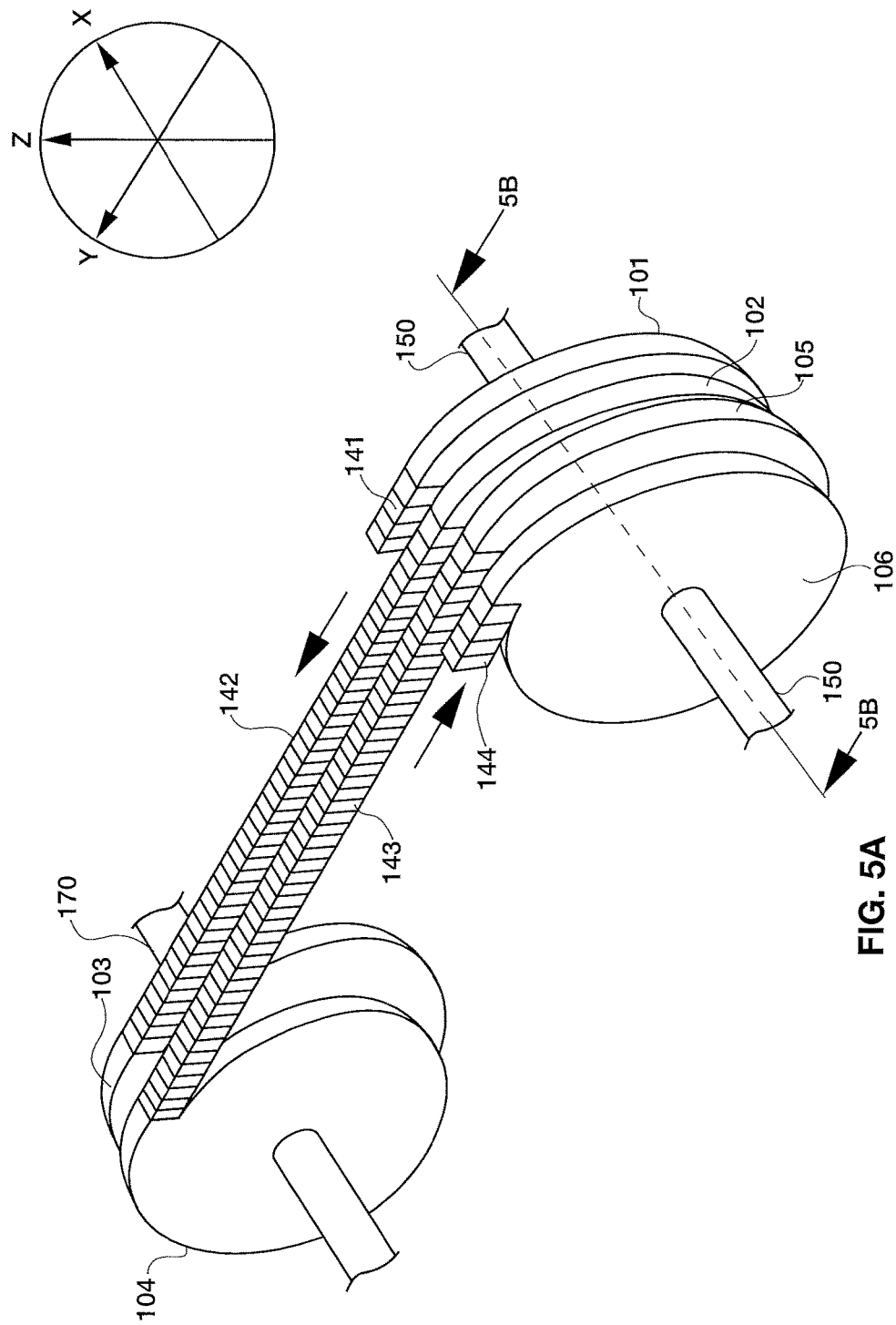
FIG. 5A is a perspective drawing of the casings and pipes of four pumps whose rotors rotate on a first axis or axle and the casings and pipes of two pumps on a second axis or axle. Two pumps on the first axis are connected to two pumps on the second axis by fluid carrying pipes. Two other pipes on the remaining pumps on the first axis introduce and expel fluid. The flow is reversed from the flow in FIG. 1A thus reversing which pumps have input at their peripheries.

FIG. 5A shows a workable, but simplified, version of a set of centrifugal pumps combined with pipes carrying fluid between them to act as a multistage compressor. Pump 106 receives fluid at its periphery from pipe 144. The fluid flows inward toward the pump 106 axis of rotation. The fluid then flows from pump 106 to pump 105 passing through a region of flow guides as may be seen most clearly in FIG. 5B which also shows the flow guides 151 through 154 in the vicinity of the pump rotor axis of rotation. The flow guides smoothly turn the fluid from inward radial motion in pump 106 to outward radial motion in pump 105. The fluid flows in pump 105 through the rotor region from near the axis of rotation to the periphery. The rotor of pump 106 has blades 31 attached to discs. The rotor of pump 105 has blades 31 attached to discs. All rotor blades are labeled 31. The rotor of pump 106 rotates because one of the two discs is attached to the axle 150. The rotor of pump 102 rotates because one of its disc is attached to the axle 150. The flow guides are more clearly shown in FIGS. 2A and 2B where they are labeled 51 through 54. They are round composed of full circles centered at the rotation axis or axle 150. The circles diminish in radius as the point between the two pumps is approached and then increase in radius until they end at pump 105. The apparent circles in FIG. 2A and FIG. 2B are the ends of the flow guides. The apparent arches are the outside of the flow guides showing how the circles diminish then increase in radius. The flow guides are like two round funnels attached at their smallest opening.

Figure 5B:
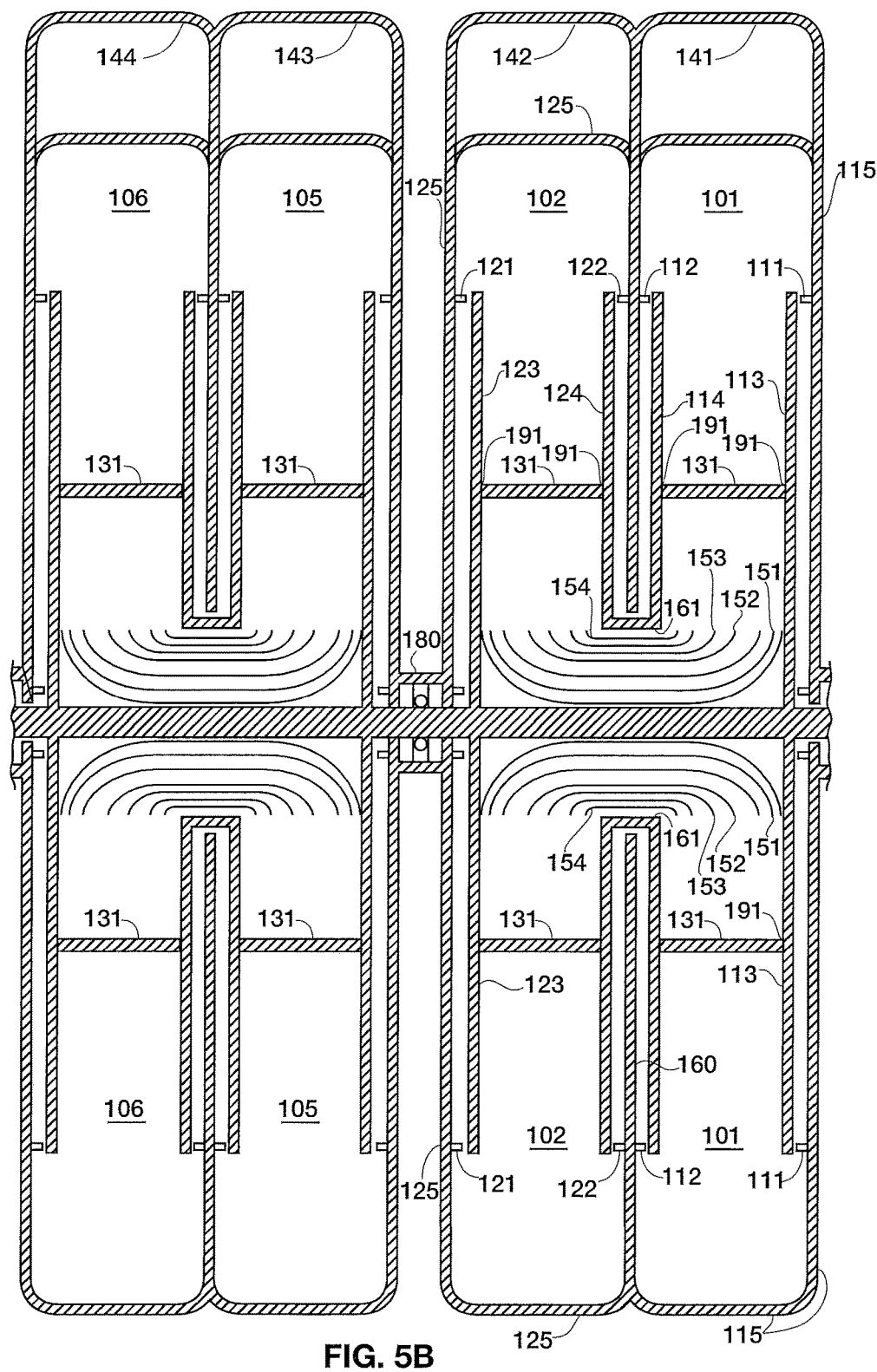
FIG. 5B shows a planar cut containing the axis of the four pumps. It shows the four pipes at the top of the figure, close to the points where the pipes enter the pump casings and shows rotor discs with holes at their center and centered on the axis and holding the rotors of the four pumps. It also shows the blades extending between the discs. The blades are curved and thus only are shown where the cut intersects the blades. It also shows a cut of the fluid flow guides contiguous to the axle and shows the axle.

FIG. 5B is like FIG. 1B except instead of a multistage reverse compressor we have a multistage compressor and numbers of corresponding parts have 100 added to the part number. Since flow now starts at pipe 44 the description started there. If the discussion extended to pumps 102 and 101 then corresponding parts would be discs 113 and 114 with blades 131 looking like webbing extending between them and discs 123 and 124 with blades 131 extending between them. Attachment points (lines) blades to discs are points 191. Rotor casing 125 is an inner part of the casing that spirals fluid outward until the casing merges into pipe 142 for pump 102. Similarly the casing in 101 spirals outward to merge into pipe 141. Parts 121 and 111 correspond to parts 21 and 11. Parts 121 and 122 112 and 111 correspond to 21, 22, 12 and 11.

The flow guides are in most part locally substantially parallel but the distance between them can vary somewhat with position. In this case the flow guides divide the flow into several distinct paths. The flow guides rotate with the axle and are connected to each other by supports or columns 58 shown in FIG. 2A that extend between nearest flow guides and can be used to maintain rotation of the flow. Some supports also extend from the axle to the nearest flow guide.

Figure 6B:
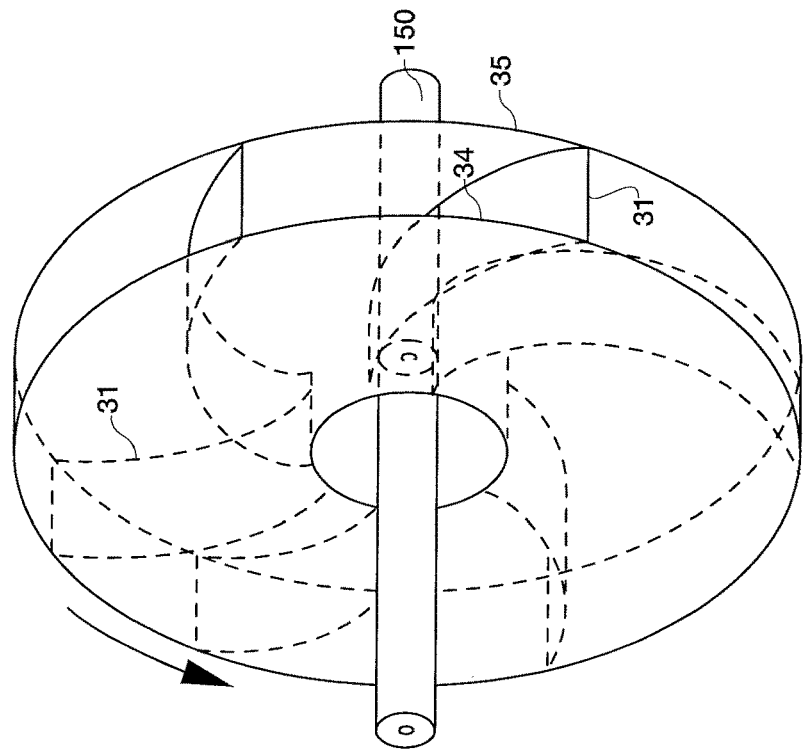
FIG. 6B shows another rotor with blades held between discs. The disc through which fluid travels to or from the pump has a larger hole at the center than the other disc which attaches to the axle as can be seen in FIG. 5B.
Figure 6A:
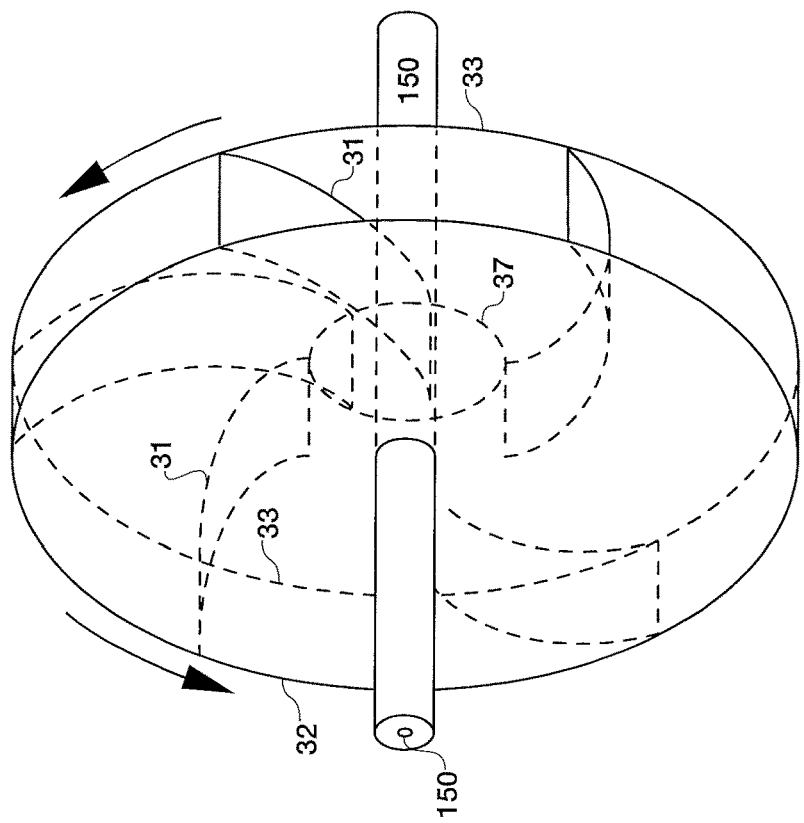
FIG. 6A shows one rotor with blades held between discs. The disc through which fluid travels to or from the pump has a larger hole at the center than the other disc which attaches to the axle as can be seen in FIG. 5B.

FIGS. 6A and 6B show rotors with blades and show the direction of rotation for a multistage compressor. FIG. 6B is for pump 105 and pump 101 wherein the fluid flows from near the center of the pump chamber to the periphery of the pump chamber. Notice that the blades push the fluid outward. FIG. 6A is for pumps 102 and 106 wherein the fluid flows from the periphery of the pump chamber to near the center of the pump chamber and the flow spiral rotation will be in the opposite direction as the rotor rotation thus the fluid is rammed into a rotor blade spinning toward it. The blades are held between discs 32, 33, 34, and 35. Disc 32 and disc 33 in FIG. 6A hold the blades 31 at two edges for each blade. Disc 34 and disc 35 in FIG. 6B hold the blades 31 at two edges for each blade. Hole 37 in disc 33 allows fluid to leave the pump near the axle. A similar hole on disc 34 allows fluid to enter the pump near the axle.

Figure 7:
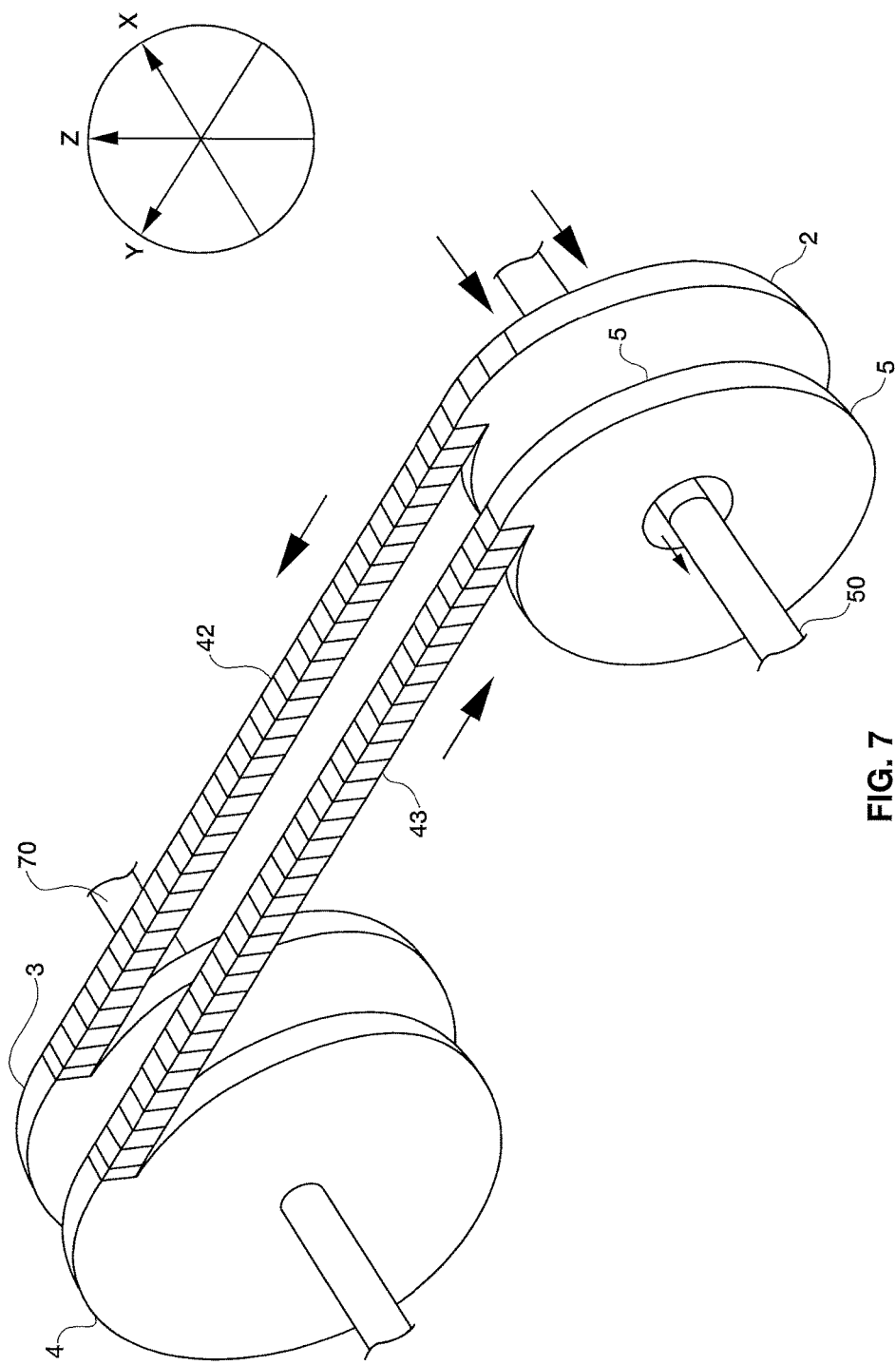
FIG. 7 shows what FIG. 1A would look like if the pump land pump 6 were removed. The fluid input now is at the axis or axle (center) of the pump 2. The fluid exit is now from pump 5 at the axis or axle.

FIG. 7 shows that the input flow can come from the center along an axle for both the multistage compressor and the multistage reverse compressor otherwise called an expander. Also fluid can exit near the center along the axle.

Figure 8:
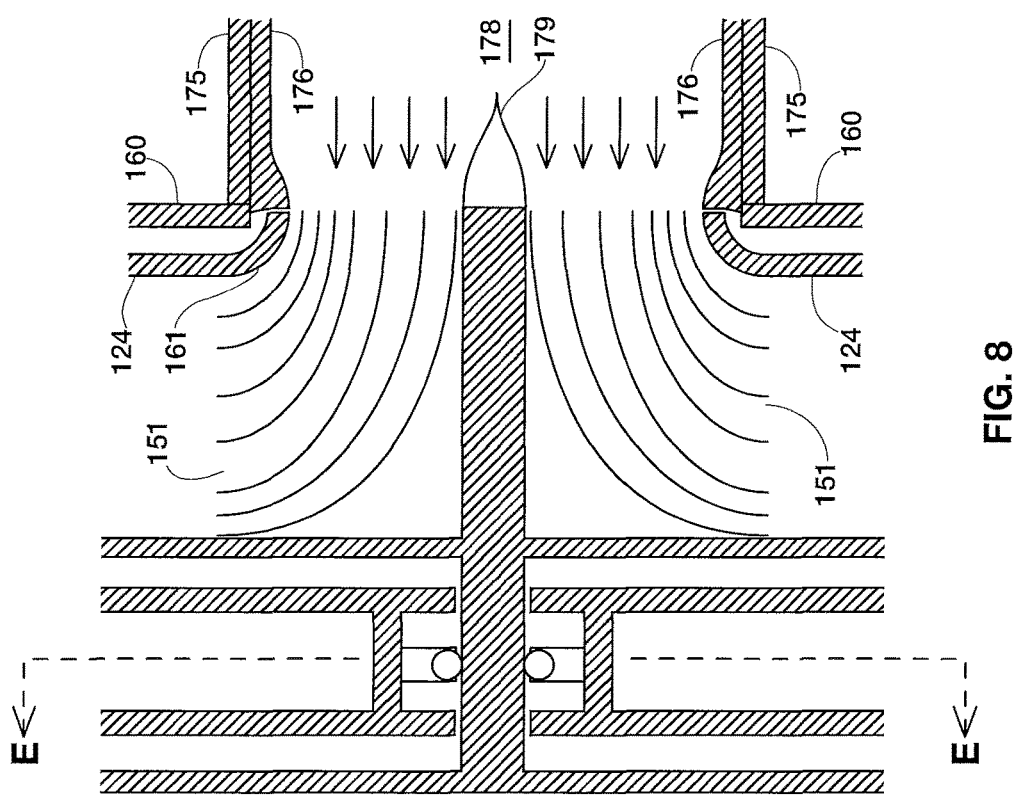
FIG. 8 shows how a fluid input from the right can enter the pump which has flow traveling outward from the vicinity of the axis. The flow guides convert from axial to radial flow.

FIG. 8 shows how the input flow can come from the center along an axle for both the multistage compressor and the multistage reverse compressor otherwise called an expander.

FIG. 8 also shows the new look of the center with heated gases being introduced from the right. In FIG. 8, parts 176 and 175 are parts of a source of combustion gases or a source of heated gases. The source 178 could be any of the sources shown in FIG. 4A, 4B, or 4C. Part 175 is attached to casing part 160, which is one part of a pump casing. Part 160 was the common part of two pump casings but one pump has been removed to be replaced by the source of combustion gases 178. Part 124 is the right disc of a rotor. The arrows show combustion gases entering the flow guides 151 from source 178. Pointed splitter 179 is attached to the axle to smooth flow from the source to the guides. Part 176 was added to smooth flow to the guides, and maybe also to insulate part 175 from the intense heat. FIG. 8 is only part of the engine and continues to the left, to the right, toward the top and toward the bottom of the figure. It mainly shows how the combustion gases enter the engine.

Figure 9:
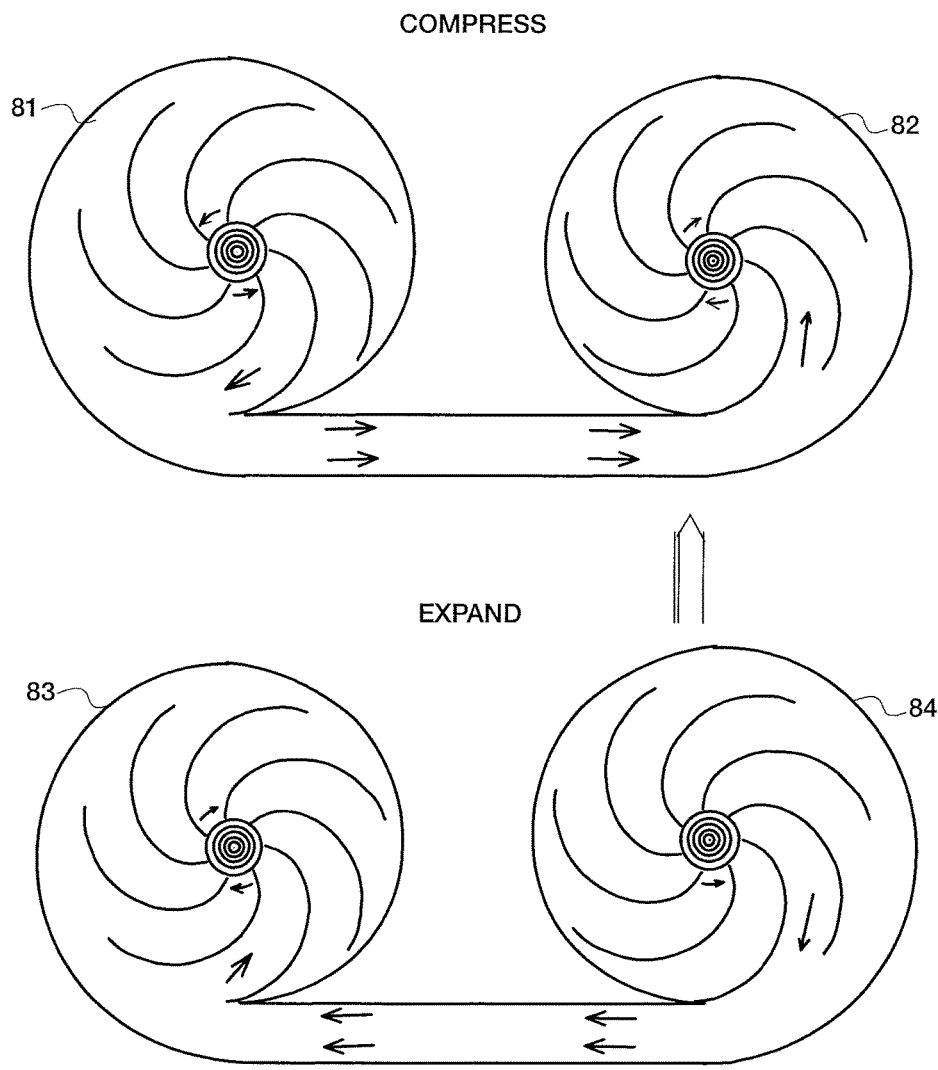
FIG. 9 shows a cross-sectional view of a multistage compressor (top) and a cross-sectional view of a multistage expander (bottom).

FIG. 9 was added to show the difference between a multistage compressor and a multistage reverse compressor aka an expander. The top pictures components of a multistage compressor. The top shows a cross-section of a centrifugal pump 81. It receives flow at its center where the concentric circles being cuts of flow guides introduce flow. The rotor of pump 81 rotates counter clockwise as shown by the smallest arrows. The flow proceeds roughly parallel to the blades of the rotor flow leaving the pump at its periphery. The flow rotates counter clockwise at the rotor. It proceeds along the pipe the flow being indicated by double arrows and being counter clockwise around the flow guides and rotor. It enters pump 82 traveling counter clockwise around the center of this pump and proceeds into the rotor blades which are rotating clockwise. The blades scoop the fluid flow thus facilitating ramming and pressure buildup. The blades provide a component of force toward the center as they meet the fluid which fluid eventually leaves the pump 82 at the flow guides at its center.

The bottom pictures components of a multistage expander. It has all the arrows reversed from the top multistage compressor. The reversal includes the double arrows in the pipe and the rotation arrows of the rotors of both pumps. The bottom shows a cross-section of a centrifugal pump 83. It receives flow at its periphery where the pipe attaches to the pump.

The rotor of pump 83 rotates clockwise as shown by the smallest arrows. The flow proceeds roughly parallel to the blades of the rotor flow leaving the pump at its center the concentric circles being cuts of flow guides leading to a pump not shown. The flow in pump 83 rotates clockwise at the rotor. It came from along the pipe the flow being indicated by double arrows and being clockwise around the flow guides and rotor and the center flow guides. It came from pump 84 traveling clockwise around the center of this pump 84 and came from the rotor blades which are rotating counter clockwise as can be seen by the little arrow at the center of pump 84. The blades receive fluid flow from the center of pump 84 and the fluid caused the blades to rotate counter clockwise. The fluid however entered the pipe rotating clockwise around the center of the pump 84. This is because angular momentum of the blades must be opposite to angular momentum of the fluid flow by conservation of angular momentum. Actually even the flow between kinetic energy of the rotor and fluid heat and pressure and kinetic energy is reversed.

Other features of FIG. 1B should be addressed. The figure is somewhat symmetrical around the axle 50, so the numbering of parts at the bottom is the same as the numbering at the top. The rotors are symmetric. The casing spirals outward a little as we go around the axle. The casing of the pumps consists of what can be a connected set of parts. Part 15 for pump 1, is not attached to the axle but comes very close to it, where a pressure seal may be placed. They are separate because the axle extends through the shown casing and while the axle rotates the casing is stationary. Part 15 also stretches across the periphery, at the top and bottom of the drawing. Casing part 60 which is common to pump 1 and pump 2 extends from the periphery to close to the nearest points to the flow guides, on discs 14 and 24. Discs 14 and 24 are connected together by part 61 near the double funnel shaped flow guides. Parts 11 and 21 are rings to inhibit flow from going outside the discs from near the periphery to near the axle. A better and second place to put rings extending between the discs and the casing is near the axle, as shown in FIG. 1B.

If the flow were to get near the axle it might go along the axle to another set of pumps, for example pumps 5 and 6. Parts 12 and 22 are rings to inhibit flow from going in the space between disc 14 and part 60 and between disc 24 and part 60, thus traveling between pump 1 and pump 2. These rings 12 and 22 could have been moved much closer to the axle, thus producing less torque per contact and less ring length. Notice that all discs are separated from the casing by a gas filled space. Thus for the blades, which are attached to and between the discs, and the discs themselves almost no moving part is near the casing. The discs have circular symmetry and thus their rotation will not cause significant eddy currents. Also remember that the word pump applies to an expander in the current discussion.

The words inward and outward refer to direction of flow between periphery and axle within the pumps used in the centrifugal multistage expanders and compressors.

The vanes are sometimes called blades. The blades extend from one disc to the other and thus form channels extending from near the axle to near the periphery.

Do not take the word discs too literally. They will probably be thinner, knife edged, at the perimeter and thicker near the center of rotation. They may also diverge from each other as their perimeters are approached. This divergence helps to slow the acceleration of the working fluid and increase the pressure change. The fluid pressure change rather than flow rate is emphasized at the output from the compressor. The discs also prevent the blades from sweeping working fluid from their surrounding surfaces. Each blade may be replaced by multiple blades at varying distances from the rotation axis. A set of blades may be rotatable to a small extent relative to the discs holding them in place. Rotated blades could allow the engine to compensate for the effects of differing speeds by adjusting blade angle so that the fluid always meets each blade substantially parallel to the blade surface.

The present inventions, while having rotors moving with respect to their casing, can have the rotor blades protected between substantially disc-like plates, so that the blades do not move with respect to their immediate surroundings, namely the discs also called plates. The discs themselves can be away from their surroundings, except on or near their peripheries. They can also diverge as their perimeters are approached to allow the fluid gradually more cross-section to flow through. Each disc being symmetric around its axle or axle extended, causes little drag on the surrounding working fluid.

For preventing eddy currents, due to centrifugal force and blade curvature, the distance between blades should be about one tenth of the curvature radius of the blades if the blades were not moving, but much more if the blades are causing centrifugal forces. For example, halfway to the periphery a new set of blades should be added extending to the periphery of the discs from the halfway point. Actually adding more blades is advantageous at all distances from the center. This has a practical limit because of the thickness and weight of blades. The weight limits ultimate speed because of centrifugal forces tending to pull the rotor apart.

Ideally the blades of the centrifugal pump rotors meet the fluid or in the opposite direction expel the fluid so that the fluid is traveling in a direction parellel to the blade surface just before contact and just after leaving each blade. Each blade may be replaced by several blades at varying distances from the axis.

Note also that the inner third of the rotors provides only one ninth of the compression effect, because the compression rate per distance at a particular distance from the axle is proportional to radius. This is because the force is proportional to radius. Thus the inner third of the fluid flow space can be allocated to making a gentle turn from radial inward flow to radial outward flow as shown in the flow guide discussions. Flow guides in the figures are shown within a small distance from axle 50.

Note that the discs, while shown as flat neither concave nor convex, in for example FIG. 1 can be shaped differently. For example, they may diverge from each other as they approach the center. They may diverge from each other as they approach the periphery. A pair of discs may both tend toward the direction of the flow guides as they approach the center, thus making the change of direction of the fluid within the flow guide region diminish.

Note that the sides of the discs opposite to the sides connected to the vanes may be insulated to keep the heat in the flow region. Of course all parts can be insulated to discourage losses due to heat traveling especially along the discs or vanes.

The close spacing of the flow guide parts discourages turbulence and studies have determined the best spacing. A ratio of 10:1 between the radius of curvature of the fluid path and the spacing across a flow between a flow guide and a neighboring guide[s] as seen in FIG. 1B or as seen looking at guides 51 and 52 for example in FIG. 2B. In FIG. 2B we see the space between the flow guide arches is about 1 tenth the radius of curvature of the arches.

Of course part 60, a shared casing wall, could be two separate parallel parts.

The pumps although pictured as identical may vary in size, mainly the distance between discs, to allow for shrinking or expansion of the working gas. Also the radial dimensions may vary to keep pressure drop ratios to similar sizes in successive pumps.

Notice that FIG. 1B can continue to the right or left, adding more pumps and "ball" bearing structures. The bearings part 80 in FIG. 1B need not be balls, but could be cylinders or maybe magnetic or hydraulic bearings, etc.

Various sources of energy may be used in combination with the embodiments disclosed herein. Relating to the source of heated gas for my engine, one source is solar power heated compressed air. The required heat exchanger is related.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A multistage reverse compressor to convert fluid energy to mechanical energy, said multistage reverse compressor comprising a series of pumps which are each centrifugal pumps, a fluid output from each pump flowing into the next pump of the series until the final pump of the series is reached said series comprising:

a first inward flowing pump comprising a first chamber with an opening at the periphery of the first chamber for a fluid to enter the first chamber and an exit near the center of the first chamber for the fluid to leave the first chamber, said first chamber including a first rotor rotating on a first axis with the center of gravity of said rotor being near the center of said chamber, said rotor rotating with respect to said first chamber, said fluid entering from the opening at the periphery of said first chamber and flowing toward said exit of said chamber, said fluid spiraling the rotor of said first chamber in the same rotational direction as said fluid, a first outward flowing pump comprising a second chamber with an opening near the center of the second chamber for a fluid to enter into the second chamber and an exit at the periphery of the second chamber for the fluid to leave the second chamber, said second chamber including a second rotor rotating on said first axis with the center of gravity of said second rotor being near the center of said second chamber, said second rotor spiraling the fluid toward the exit at the periphery of said second chamber when said fluid enters from said opening, said fluid spiraling in the opposite rotational direction as said rotor of said second chamber, a second inward flowing pump comprising a third chamber with an opening at the periphery of the third chamber for a fluid to enter into the third chamber and an exit near the center of the third chamber for the fluid to leave the third chamber, said third chamber including a third rotor rotating on a second axis with the center of gravity of said third rotor being near the center of said third chamber, said second axis being spaced apart from said first axis at each of said first and second rotors mentioned above by at least the radius of that rotor, said third rotor rotating with respect to said third chamber, said fluid entering from the opening at the periphery of said third chamber and flowing toward said exit of said third chamber, said fluid spiraling the rotor of said third chamber in the same rotational direction as said fluid, and a second outward flowing pump comprising a fourth chamber with an opening near the center of the fourth chamber for a fluid to enter into the fourth chamber and an exit at the periphery of the fourth chamber for the fluid to leave the fourth chamber, said fourth chamber including a fourth rotor rotating on said second axis with the center of gravity of said fourth rotor being near the center of said fourth chamber, said fourth rotor spiraling the fluid toward the exit at the periphery of said fourth chamber when said fluid enters from said opening, said fluid spiraling in the opposite rotational direction as said fourth rotor of said fourth chamber, wherein fluid flows through the first inward flowing pump, the first outward flowing pump, the second inward flowing pump, and the second outward flowing pump in succession.

2. A multistage compressor to convert mechanical energy to fluid energy, said multistage compressor comprising a series of pumps which are each centrifugal pumps, part of the fluid output from each pump flowing into the next pump of the series until the final pump of the series is reached said series comprising:

a first inward flowing pump comprising a first chamber with an opening at the periphery of the first chamber for a fluid to enter the first chamber and an exit near the center of the first chamber for the fluid to leave the first chamber, said first chamber including a first rotor rotating on a first axis with the center of gravity of said rotor being near the center of said chamber, said rotor rotating with respect to said first chamber, said rotor rotating in one direction, said fluid entering from the opening at the periphery of said first chamber and flowing toward said exit of said first chamber of said first inward flowing pump, said fluid spiraling in the opposite direction of said rotor of said first chamber, a first outward flowing pump comprising a second chamber with an opening near the center of the second chamber for a fluid to enter into the second chamber and an exit at the periphery of the second chamber for the fluid to leave the second chamber, said second chamber including a second rotor rotating on said first axis with the center of gravity of said second rotor being near the center of said second chamber, said second rotor spiraling the fluid toward the exit at the periphery of said second chamber of said first outward flowing pump when said fluid enters from said opening, a second inward flowing pump comprising a third chamber with an opening at the periphery of the third chamber for a fluid to enter into the third chamber and an exit near the center of the third chamber for the fluid to leave the third chamber, said third chamber including a third rotor rotating on a second axis with the center of gravity of said third rotor being near the center of said chamber, said second axis being spaced apart from said first axis at each of said first and second rotors mentioned above by at least the radius of that rotor, said third rotor rotating with respect to said third chamber, said fluid entering from the opening at the periphery of said third chamber and flowing toward said exit of said third chamber said rotor rotating in one direction, said fluid spiraling in the opposite direction of said rotor of said third chamber, and a second outward flowing pump comprising a fourth chamber with an opening near the center of the fourth chamber for a fluid to enter into the fourth chamber and an exit at the periphery of the fourth chamber for the fluid to leave the fourth chamber, said fourth chamber including a fourth rotor rotating on said second axis with the center of gravity of said fourth rotor being near the center of said fourth chamber, said fourth rotor spiraling the fluid toward the exit at the periphery of said fourth chamber of said second outward flowing pump when said fluid enters from said opening, said fluid spiraling in the same rotational direction as said fourth rotor of said fourth chamber, wherein fluid flows through the first inward flowing pump, the first outward flowing pump, the second inward flowing pump, and the second outward flowing pump in succession.

* * * * *

UNITED STATES PATENT AND TRADEMARK OFFICE
CERTIFICATE OF CORRECTION

PATENT NO. : 10,072,665 B1
APPLICATION NO. : 15/200020
DATED : September 11, 2018
INVENTOR(S) : Ronald E. Graf Page 1 of 1

It is certified that error appears in the above-identified patent and that said Letters Patent is hereby corrected as shown below:

In Column 8, Line 31, --land-- should be "1 and"

Signed and Sealed this
Thirtieth Day of October, 2018

Andrei Iancu
*Director of the United States Patent and Trademark Office*